United States Patent [19]

Crandall et al.

[11] Patent Number: 5,390,296
[45] Date of Patent: Feb. 14, 1995

[54] METHOD AND APPARATUS FOR CALCULATION WITH DISPLAY DATA

[75] Inventors: Richard L. Crandall; Ellen R. Craw; James A. Lahey; Dorothy A. Lieffers, all of Ann Arbor; Patrick E. Miller, Pinckney, all of Mich.

[73] Assignee: Comshare Incorporated, Ann Arbor, Mich.

[21] Appl. No.: 132,495

[22] Filed: Oct. 6, 1993

Related U.S. Application Data

[63] Continuation of Ser. No. 400,812, Aug. 30, 1989, abandoned.

[51] Int. Cl.⁶ ............................................. G06F 15/62
[52] U.S. Cl. ...................................... 395/159; 395/161
[58] Field of Search ............................... 395/155–161, 395/148–149, 154; 364/408; 345/115, 119, 121, 123

[56] References Cited

U.S. PATENT DOCUMENTS

| Re. 28,238. | 11/1974 | Koster | 340/172.5 |
|---|---|---|---|
| D. 296,705 | 7/1988 | Wells-Papanek et al. | D18/27 |
| 3,364,473 | 1/1968 | Reitz et al. | 340/172.5 |
| 4,425,627 | 1/1984 | Eibner | 364/900 |
| 4,434,475 | 2/1984 | McCaskill et al. | 364/900 |
| 4,435,777 | 3/1984 | McCaskill et al. | 364/900 |
| 4,506,343 | 3/1985 | Shipp, Jr. et al. | 364/900 |
| 4,521,870 | 6/1985 | Babbel et al. | 364/900 |
| 4,559,598 | 12/1985 | Goldwasser et al. | 364/419 |
| 4,656,603 | 4/1987 | Dunn | 364/521 |
| 4,677,552 | 6/1987 | Sibley, Jr. | 364/408 |
| 4,763,356 | 8/1988 | Day, Jr. et al. | 379/368 |
| 4,772,882 | 9/1988 | Mical | 395/156 |
| 4,866,638 | 9/1989 | Cosentino et al. | 395/159 |
| 4,931,783 | 6/1990 | Atkinson | 395/156 |
| 4,974,174 | 11/1990 | Kleinman | 395/156 |
| 4,989,141 | 1/1991 | Lyons et al. | 364/408 |
| 5,040,131 | 8/1991 | Torres | 395/156 |
| 5,165,012 | 11/1992 | Crandall et al. | 395/157 X |

OTHER PUBLICATIONS

Lucid 3-D Tutorial Guide, Personal Computer Support, 1987, Chpt 7, chpt 11-1 to 11-13, 14-14 to 14-17, 15-8 to 15-9, Chpts. 16, 22, 23.
The Worksheet Utilities, Funk Software, 1987, pp. 10–53,55–61.
Antonoff, "New Dimensions for Spreadsheets", Personal Computing, Mar. 1988, pp. 122–130.
Byers, "TopView IBM's long-awaited multitasking program makes its debut," Byte, Fall, pp. 247–251, 1985.
John F. Rockart and Michael E. Treacy, "The CEO Goes On-Line," Harvard Business Review, Jan.–Feb. 1982, pp. 82–88.
John F. Rockart and David W. DeLong: "Executive Support Systems, The Emergence of Top Management Computer Use," Dow Jones–Irwin, 1988, pp. 23, 106–107, 133, 142–143, 183, and 195.
Comshare Commander Executive Information System Guide, 1987; Ser. No. 277094.
Comshare Commander Executive's Guide; Dec. 1987; Ser. Nos. 290208.
Comshare Commander Executive's Guide; Aug. 1988; Ser. No. 313365.
Comshare Commander EIS Brochure; May 23, 1989; Ser. No. 342332.
Multi–Dimensionality in a Decision Support System; 1983; Ser. No. 160645.
What Makes System W Different 48 ; 1988; Ser. No. 324238.
"Strategic Information at Your Fingertips"; 1986.

*Primary Examiner*—Mark R. Powell
*Assistant Examiner*—John E. Breene
*Attorney, Agent, or Firm*—Finnegan, Henderson, Farabow, Garrett & Dunner

[57] ABSTRACT

A method and apparatus for facilitating analysis of data in a data base. The data base data is displayed on a touch sensitive screen. A calculator icon is overlayed on the data. A user selects a function, such as "TOTAL," by touching a corresponding function button displayed as part of the calculator icon. The user then selects the data to be totaled by touching a row header or column header for the data rows or columns he wishes to include in the calculation. Once the data for the calculation is selected, a "=" icon is touched, and a new row or column holding the results of the calculation is inserted into the displayed data. The calculation is displayed in a window of the calculator icon as the calculation is built by the user.

28 Claims, 10 Drawing Sheets

| | |
|---|---|
| 1002 | IDENTIFIER |
| 1004 | BUTTON COUNT |
| 1006 | BUTTON SIZES AND POSITIONS |
| 1008 | DISPLAY AREA BACKGROUND COLOR |
| 1010 | DISPLAY AREA TEXT |

| | |
|---|---|
| 1102 | ENABLED FLAG |
| 1104 | FOREGROUND COLOR |
| 1106 | TEXT COLOR |
| 1108 | SPECIAL FLAG |
| 1110 | BUTTON TEXT |

| | |
|---|---|
| 1202 | RECORD TYPE |
| 1204 | CONTINUATION RECORD NUMBER |
| 1206 | UP TO 5 OPERAND RECORD NUMBERS |
| 1208 | FUNCTION |
| 1210 | DELETE PENDING FLAG |
| 1212 | DIMENSION NUMBER |
| 1216 | ITEM NAME |
| 1218 | PRECEDING AND SUBSEQUENT TREND RECORD NUMBERS |
| 1220 | PARENT ITEM NUMBER |
| 1222 | ITEM LIST POSITION UNDER PARENT |

| | |
|---|---|
| 1302 | RECORD TYPE |
| 1304 | NEXT CONTINUATION RECORD NUMBER |
| 1306 | UP TO 10 OPERAND RECORD NUMBERS |

METHOD AND APPARATUS FOR CALCULATION WITH DISPLAY DATA

This application is a continuation of application Ser. No. 07/400,812, filed Aug. 30, 1989, now abandoned.

BACKGROUND

The present invention relates to the field of interactive manipulation of stored data, and in particular, to the real-time analysis and display of data stored in a multi-dimensional data model.

Multi-dimensional data models are used to represent data in a way that accurately reflects the interaction of the different components of that data. For example, a company's sales figures may include information on sales by year, by region (which can be further broken down into districts and salespersons), or by product (which can also be further broken down into sales by models or sales by factories which produce the products). The sales information can also include additional relevant data such as commissions, purchasers, budgets, projected expenses, and actual expenses.

A multi-dimensional data model allows different users, each of whom may have a need for different kinds of data, to use the same data model in different ways. For example, one user may need to examine the sales and commissions of each salesman, while a different user may need to know the sales for each product and by each salesman. A third user may want to analyze the sales per region, as well as the sales per district in the region. Without a multi-dimensional data model, different data bases would have to be created and maintained for each user who wanted to examine the data in different ways. With a multi-dimensional data model, however, a single data base can support the different users. Thus different data bases do not need to be written, and a single data base is all that needs to be updated.

In addition, a multi-dimensional data model promotes growth because it has a certain inherent flexibility. For example, one does not need to predict all the uses of the data model at the outset because the multi-dimensional data model allows different uses. In addition, if additional data is deemed to be important, that data can be added to the multi-dimensional data model by adding another dimension.

An example of a multi-dimensional data model is manufactured by Comshare, Inc., the assignee of the this application. One of its products, the COMMANDER EXECUTIVE INFORMATION SYSTEM, employs a multi-dimensional data model which displays user-selected two-dimensional views. FIGS. 1–3 shows different two-dimensional views of a sample multi-dimensional data model.

Other examples of multi-dimensional data models can be found in Rockart J. F, "The CEO Goes Online," Harvard Business Review, 1981 and in Rockart & DeLong, "Executive Support Systems," published by Dow Jones-Irwin, 1988. A two-dimensional view of a multi-dimensional data model, however, should not be confused with standard two-dimensional data representations such as are provided by standard spreadsheets. The data model for such spreadsheets is still two-dimensional and does not allow a user to select a view of a common data model, nor does it provide the flexibility of a multi-dimensional data model.

It would be advantageous to allow a user of a multi-dimensional data model to perform certain on-line calculations of the data in the model.

It would additionally be advantageous to have the on-line calculations displayed and treated as if they were part of the multi-dimensional data model itself in order to enhance the analysis of the data in the model.

It would also be advantageous to display the calculated values in a manner which differentiated them from the values in the data base in order to avoid confusion from use.

It would also be advantageous to have a simple and user-friendly interface which allowed non-technical users to perform the on-line calculations.

Additional advantages of the present invention will be set forth in part in the description which follows and in part will be obvious from that description or may be learned by practice of the invention. The advantages of this invention may be realized and obtained by the methods and apparatus particularly pointed out in the appended claims.

SUMMARY OF THE INVENTION

The present invention obtains the advantages listed above by using a calculator icon which can be displayed along with the display of portions of a multi-dimensional data model. The functions listed on the calculator icon can be selected, along with different portions of the data model, to perform the type of analysis desired by a user. The calculated values can then be displayed alongside the values stored in the underlying multi-dimensional data model.

More specifically, to achieve the objects and in accordance with the purpose of the invention, as embodied and broadly described herein, the invention involves a method for facilitating analysis of data in a data file stored in a computer system. The present invention comprises the following steps executed by the computer system: displaying on a computer screen a graphical representation of the data file; displaying on the computer screen a graphical representation of a plurality of functions capable of being applied to portions of the data in the data file; receiving from an input device information identifying a selected one of the functions; receiving from the input device information identifying selected portions of the stored data file to which the selected function is to be applied; applying the selected function to the selected data file portions to produce a set of calculated results; entering the set of calculated results into the data file; and displaying the calculated results on the computer screen as part of the displayed representation of the data file.

In a different context, a method of this invention for facilitating the analysis of data in a multi-dimensional data model stored in a computer system comprises the following steps executed by the computer system: displaying a two-dimensional view of the data model on a computer screen; displaying a calculator icon on the computer screen, the calculator icon including a plurality of button representations each corresponding to a different function capable of being applied to the data in the data model; receiving from an input device coupled to the screen an indication that one of the button representations has been selected, thereby selecting the function corresponding to the selected button representation; altering the two-dimensional view of the data model to indicate the portions of the two-dimensional view that are appropriate for the selected function;

receiving from the input device indications of selected ones of the indicated data model portions to which the selected function is to be applied; applying the selected function to the selected data model portions to produce a set of calculated results; and displaying the set of calculated results on the screen as part of the two-dimensional view of the data model.

Also, in accordance with this invention, an apparatus facilitates analysis of data in a data file stored in a computer system. The apparatus comprises a computer screen; means for displaying on the computer screen a graphical representation of the data file; means for displaying on the computer screen a graphical representation of a plurality of functions capable of being applied to portions of the data in the data file; an input device for reading data input by a user; means for receiving information from the input device identifying a selected one of the displayed functions; means for receiving from the input device information identifying selected portions of the stored data file to which the selected function is to be applied; means for applying the selected function to the selected data file portions to produce a set of calculated results; means for entering the set of calculated results into the data file; and means for displaying the calculated results on the computer screen as part of the displayed representation of the data file.

Another apparatus in accordance with the invention for facilitating the analysis of data in a multi-dimensional data model stored in a computer system comprises a computer screen; means for displaying a two-dimensional view of the data model on the computer screen; means for displaying a calculator icon on the computer screen, the calculator icon including a plurality of button representations each corresponding to a different function capable of being applied to the data in the data model; an input device coupled to the computer screen; means for receiving from the input device an indication that one of the button representations has been selected, thereby selecting the function corresponding to the selected button representation; means for altering the two-dimensional view of the data model to indicate the portions of the two-dimensional view that are appropriate for the selected function; means for receiving from the input device indications of selected ones of the indicated data model portions to which the selected function is to be applied; means for applying the selected function to the selected data model portions to produce a set of calculated results; and means for displaying the set of calculated results on the screen as part of the two-dimensional view of the data model.

The accompanying drawings, which are incorporated in and which constitute a part of this specification, illustrate one embodiment of the invention and, together with the description, explain the principles of the invention.

BRIEF DESCRIPTION OF THE DRAWINGS

FIG. 10 is a diagram of a first calculator data structure stored in a memory of FIG. 6, according to the present invention;

FIG. 11 is a diagram of a second calculator data structure stored in a memory of FIG. 6, according to the present invention;

FIG. 12 is a diagram of a first calculation building data structure; and

FIG. 13 is a diagram of a second calculation building data structure for continuing the first calculation building data structure of FIG. 12.

DESCRIPTION OF THE PREFERRED EMBODIMENTS

Reference will now be made in detail to a presently preferred embodiment of the invention, examples of which are illustrated in the accompanying drawings.

Figure 1:
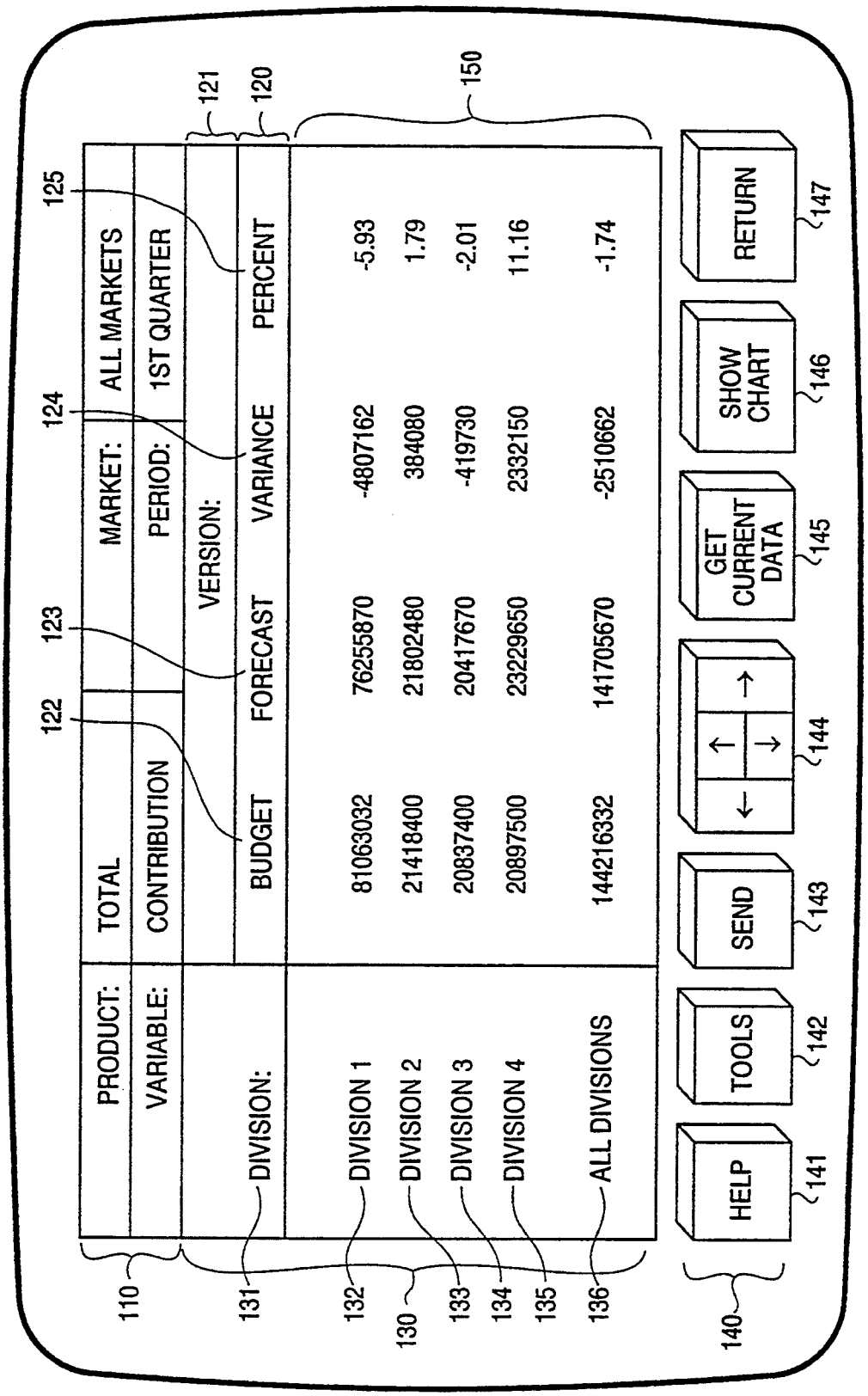
FIGS. 1–3 are different two-dimensional views of a single multi-dimensional data model.
Figure 2:
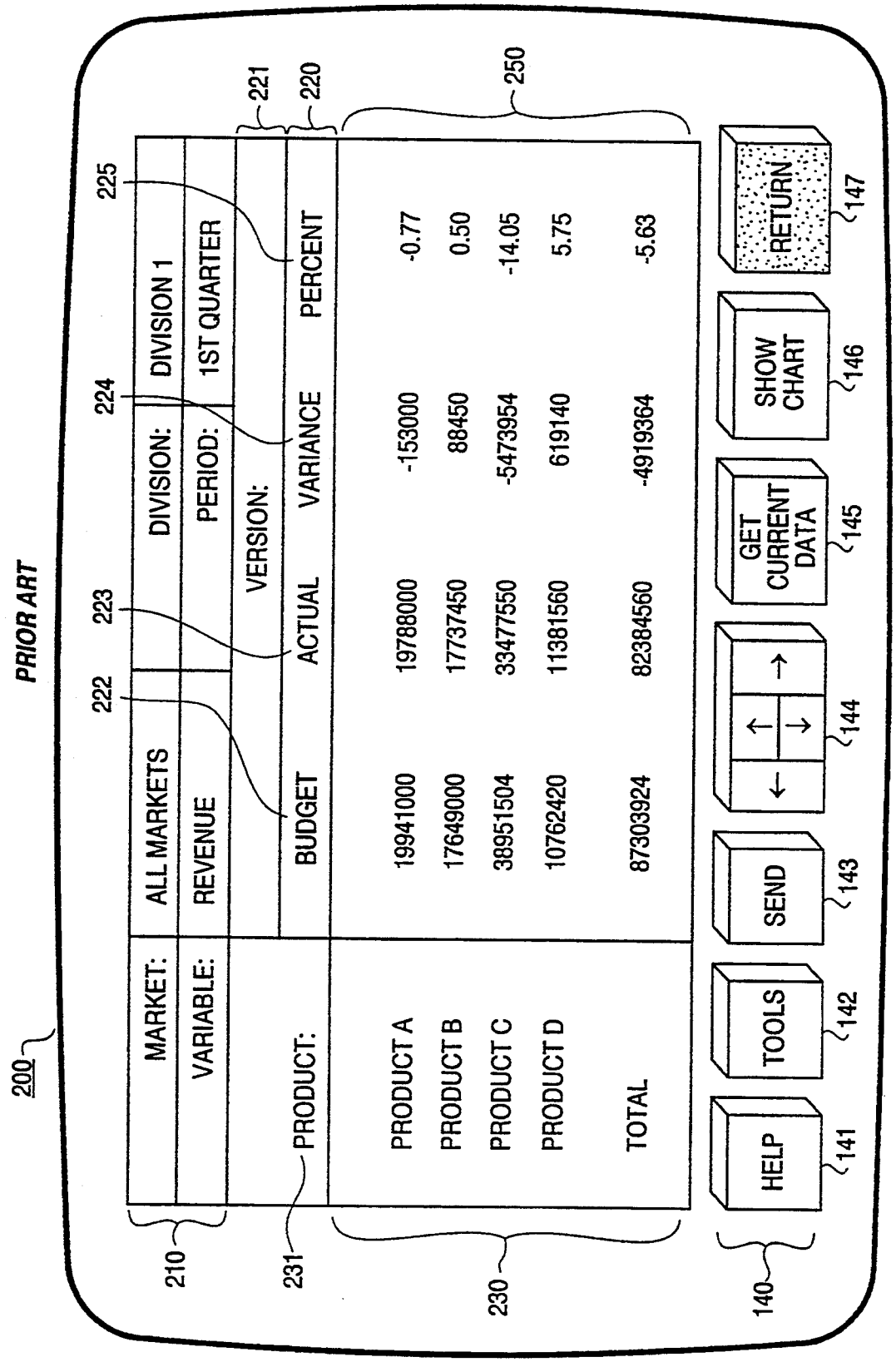
Figure 3:
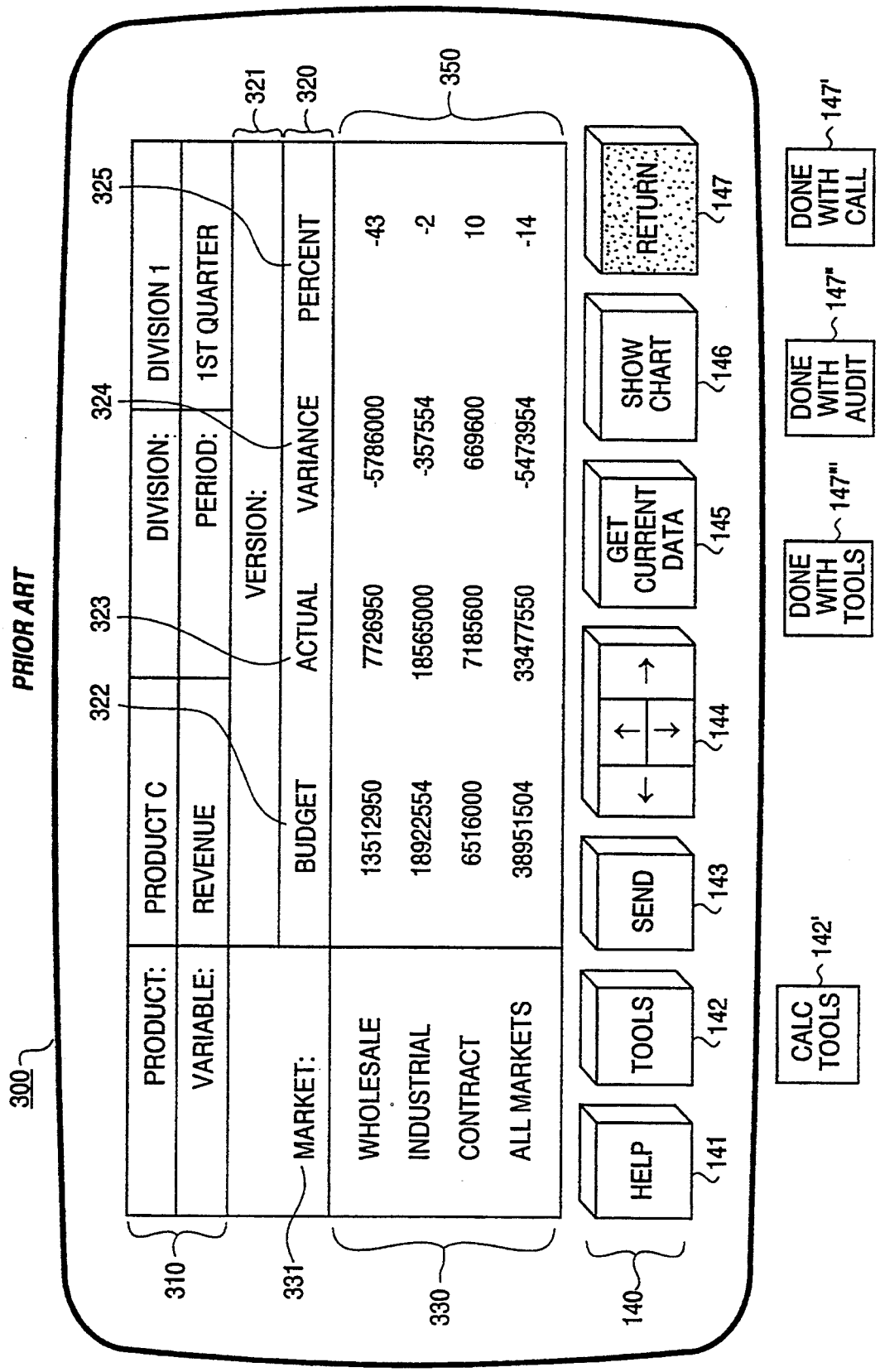

As explained above, FIGS. 1–3 are two-dimensional views, also called reports, of a multi-dimensional data model. The multi-dimensional data model shown in FIGS. 1–3 includes six dimensions: Division, Versions, Product, Variable Market, and Period. The Division dimension includes the categories of Division1, Division2, All Divisions, etc. The Versions dimension includes the Budget and Forecast categories. The Product dimension includes categories for ProductA, ProductB, Total, etc., as shown in FIG. 2. The Variable dimension includes categories for line items such as Revenue, Taxes, Profits, Costs, etc. The Market dimension includes categories such as Wholesale, Industrial, Contract, etc. The Period dimension includes categories such as 1st Quarter, 2d Quarter, etc. Persons skilled in the art will understand that the six dimensional data model described in connection with FIGS. 1–3 is for the purpose of example only. Any multi-dimensional data model may be used to practice the present invention.

The data model of FIGS. 1–3, for example, contains sales data. Corresponding portions of FIGS. 1, 2, and 3 are numbered with corresponding reference numbers. For example, FIG. 1 shows report 100, FIG. 2 shows report 200, and FIG. 3 shows report 300. Only portions of FIG. 1 will be described in detail below. The descriptions of FIG. 1 are understood to apply to correspondingly numbered portions of FIGS. 2 and 3.

In FIG. 1, a report 100 includes a view definition block 110, a column header block 120, a row header block 130, bottom button icons 140 and display area 150. Report 100 can be displayed on a standard video terminal connected to a data processor which extracts the report.

View definition block 110 describes the four dimensions not displayed in the current view shown in display area 150. A report is defined by fixing all dimensions in the data model except the two which are displayed in the report.

Report 100 also includes a column header block 120 and a row header block 130 for the particular report being shown. Column header block 120 includes a column header descriptive portion 121 and different column header items shown in FIG. 1 as "BUDGET" 122, "FORECAST" 123, "VARIANCE" 124, and "PERCENT" 125. In FIG. 1, the column header items "BUDGET" 122 and "FORECAST" 123 are names of categories in the Versions dimension of the multidimensional data base.

In a similar manner, row header block 130 includes a row header descriptor 131 entitled "DIVISION," and row header elements "DIVISION 1", "DIVISION 2", "DIVISION 3", "DIVISION 4", and "ALL DIVISIONS". "DIVISION" is the name of a dimension, and "DIVISION 1," "DIVISION 2," "DIVISION 3," "DIVISION 4," and "ALL DIVISIONS" are categories of that dimension.

As shown in FIG. 1, the view definition block 110 includes the names of the other dimensions of the multidimensional data base, such as "PRODUCT," "VARIABLE," "MARKET," and "PERIOD," as well as the particular categories of those dimensions for which data is displayed in display area 150, i.e., "TOTAL," "ALL MARKETS," "CONTRIBUTION," and "1ST QUARTER," respectively. When a view changes, the dimension categories that make up the row header block 130 or column header block 120 are replaced by the categories of one of the dimensions in view definition block 110. For example, in FIG. 1, the row headers are categories of the Division dimension and the column headers are categories of the Versions dimension. In FIG. 2, which is a report drawn from the same data model as the model in FIG. 1, the row headers are categories of the Product dimension, while the column headers remain categories of the Versions dimension. In FIG. 2, the name of the Division dimension has been moved to view definition block 110 and the category Division1 has been chosen to be displayed. Thus, FIGS. 1 and 2 show different views of the same six-dimensional data model. Similarly, report 300 in FIG. 3 shows a view where the categories of the Markets and the Versions dimensions form the row and column headers, respectively, and the names of the Products, Variable, Division, and Period dimensions are in view definition block 110 along with one selected category for each. Although column header block 120 in FIGS. 1–3 is the same while the row header block 130 differ, the column header block 120 may also differ for different views.

In FIGS. 1–3, button icons 140 are used as part of the interaction with the user. As explained in more detail below, the titles of button icons 140 can change to reflect different options presented to a user. FIGS. 1–3 show a "HELP" bottom button icon 141, a "TOOLS" bottom button icon 142, a "SEND" bottom button icon 143, scroll bottom button icons 144 (displaying arrows), a "GET CURRENT DATA" bottom button icon 145, a "SHOW CHART" bottom button icon 146, and a "RETURN" bottom button icon 147.

"HELP" bottom button icon 141 generates help messages for the user, the help messages being tailored to the particular operation which the user is trying to perform. "TOOLS" bottom button icon 142 causes a menu to appear which allows the use of different data processing tools to manipulate data or reformat the display data. "SEND" bottom button icon 143 causes a menu to appear so the user can select either storing the report or printing it. Scrolling bottom button icons 144 permits scrolling of the report. "GET CURRENT DATA" bottom button icon 145 tells a data processing system to ensure the most current data is being displayed in the report. "SHOW CHART" bottom button icon 146 causes a predefined chart of the selected data to appear. "RETURN" bottom button icon 147 causes the data processing system to return to a previous state.

Display area 150, as indicated above, contains the data indicated by the categories in display in view definition block 110. This is the data, for example, which is updated when "GET CURRENT DATA" bottom button icon 145 is selected. The data in the report is organized into rows and columns corresponding to row headers 132–136 and column headers 122–125. The rows and columns of variable data in report 100 are referred to as "data items."

Display area 150 not only shows stored data, as FIGS. 1–3 indicate, but can also show certain calculated data in accordance with the present invention. That calculated data, as will be explained in more detail, is also displayed in rows and columns. For example, the data displayed in display area 150 under the column headers "VARIANCE" and "PERCENT" in FIG. 1 are calculated data.

Report 100 is preferably part of an interactive system. Elements of report 100 or bottom button icons 140 may be selected by using a mouse or a touch screen display device. For example, the user can select a row or column by "touching" it. "Touching" is a term used to include any manner of selecting an item displayed on the screen, either by use of the mouse, a touch screen, or using any other technology.

In a presently preferred embodiment of the present invention, once a row or column is properly selected, it turns a different color to indicate the selection.

Reports are preferably selected by touching the different categories in view definition block 110. When one of the categories is touched, a menu appears which lists the available categories for a particular dimension. After selecting a particular category, the display is reoriented to provide the particular two-dimensional view or report specified by the category.

In addition to selecting reports by touching categories, different views can also be selected by appropriately changing the categories. The difference between changing a view and changing a report is subtle, but important. The same two-dimensional view of, for example, a product which is sold, can be presented in two reports, each of which has different values for one of the categories. For example, in one report, the product sales by territory may be for the year 1982, and in the next report, the product sales by territory may be for the year 1983. The view remains the same because the same type of data, i.e., products, is listed in category block 100 as shown. The report is different, however, because different portions of the data are being reported, e.g., different years.

Selecting a different view, however, selects the display of entirely different type of data. In the previous example, such a change would occur if the report were changed to show sales of different products by territory.

For proper analysis of the data in an on-line and real-time environment, it would be desirable to be able to perform certain calculations on that data. For example, one may wish to show the variance of a certain figure between years. One may also wish to multiply a product sales figure by a price figure to come up with a total revenue figure. This capability is accomplished by the present invention, and a preferred means of implementing the invention involves using a displayed calculator, such as a calculator icon 400 shown in FIG. 4. Preferably, calculator icon 400 is overlaid on top of the representation of the data base or report 100. In a preferred embodiment, the use of a calculator icon changes certain of the bottom icon buttons 140. For example, "RETURN" bottom button icon 147 becomes "DONE WITH CALC" bottom button icon 147'.

Calculator icon 400 preferably includes several calculator button icons which define both calculator functions on selected data items and control functions. The result of the calculator functions is a calculated item which is displayed adjacent certain data items in report 100. A calculated item differs from a data item in that data items represent original data and calculated items represent the result of a calculation on data items or other calculated items.

Figure 4:
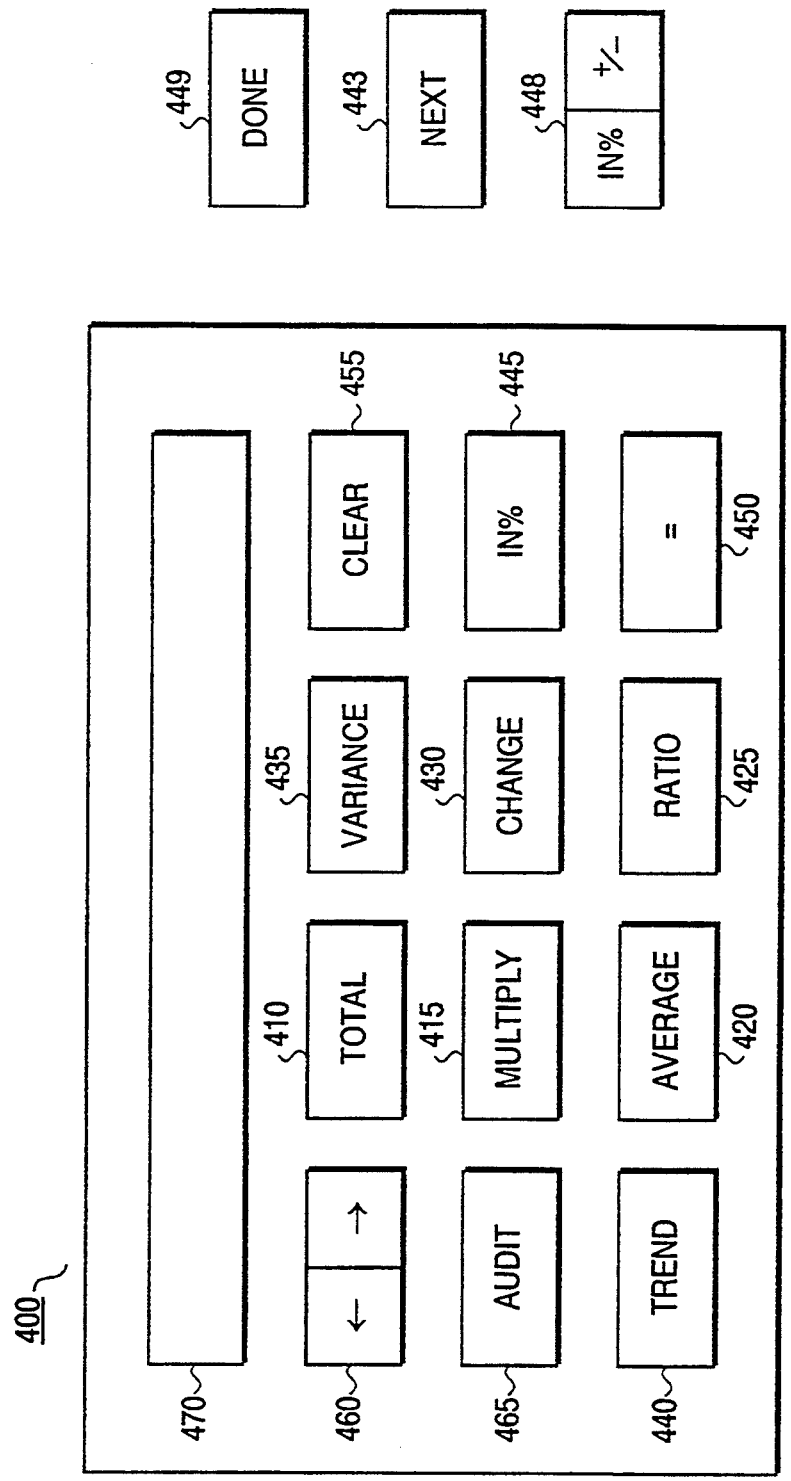
FIG. 4 is a schematic representation of a preferred calculator icon which is used in accordance with the present invention.

In calculator icon 400 of FIG. 4, a "TOTAL" button icon 410 causes selected data items to be summed and the sum to be placed in a calculated item. A "MULTIPLY" button icon 415 causes selected data items to be multiplied together to form a calculated item. An "AVERAGE" button icon 420 causes selected data items to be summed and then divided by the total number of such items in order to calculate averages. A "RATIO" button icon 425 creates ratios between a first and a subsequently selected data items. A "CHANGE" button icon 430 computes a change from a first selected data item to a second selected data item by subtracting the first selected data item from the second selected data item. "VARIANCE" button icon 435 also computes the difference between data items. "CHANGE" button icon 430 and "VARIANCE" button icon differ in that "VARIANCE" button icon 435 allows a user to alternately calculate either the difference between a first and a second selected data item, or a second and a first data item. Both "CHANGE" button icon 430 and "VARIANCE" button icon 435 allow the user to display the calculation in percentages if desired.

A "TREND" button icon 440 forecasts values for a time period based upon certain selected historical periods. "TREND" button icon 440 can only be used when the columns or rows show data selected over different periods of time. This is shown by the word "PERIOD" as the column or row header 131 or 121. After "TREND" button icon 440 is selected, additional forecast periods can be calculated by pushing a "NEXT" button icon 443, which replaces an "=" button icon 450 after "=" button icon 450 is touched for the "TREND" function.

An "IN%" button icon 445 can be used after "RATIO" button icon 425, "CHANGE" button icon 430, or "VARIANCE" button icon 435 has been touched. Touching "IN%" button 445 causes the selected configuration to be displayed as a percentage. Furthermore, after "VARIANCE" button icon 435 is selected, a "+/−" button 448 appears over a rightmost half of "=" button icon 450 to indicate whether the variance should be computed as a difference between the first and the second selected data items, or as a difference between the second and first data items. The "+/−" button icon is not displayed for the "CHANGE" function.

Other button icons perform certain control functions. For example, "=" button icon 450 causes the indicated calculator function to be executed. A "CLEAR" button icon 455 causes a clearing of the indicated function and selected data items. A scrolling button icon 460 displaying arrows causes scrolling of a window 470, described below. An "AUDIT" button icon 465 causes the equation or algorithm underlying a selected calculated item to be displayed in window 470 and the items involved in the equation to change color.

An equation is "built" by touching various of the button as described above. Window 470 in calculator icon 400 shows the particular equation to be performed, including function and data items, as it is being built and executed. If "AUDIT" button icon 465 is touched, then window 470 displays the components of the selected calculated item, or an informational message if a data item was selected instead of a calculated item.

Prior to describing the operation of the system with calculator icon 400, it is important to understand certain display rules which are involved in the operation of the calculator.

For example, in a preferred embodiment, the background of the calculator is always gray and the background of the display area is always black. Once one of the buttons or data items is available or enabled, meaning it can be touched to initiate a desired action, it assumes a color other than black and can then be selected. For example, in a preferred embodiment, when "CLEAR" button icon 455 is enabled, it is red. When scrolling button icon 460 and "+/−" button icon 488 are enabled, they are blue. When the remaining calculator button icons are enabled, they are orange. When a row or column header item is enabled it is gray, and then when it is selected, it turns blue.

The enablement or availability of the buttons depends on the state of the machine implementing this invention. In a preferred embodiment, when no calculation is currently being built, such as at the end of a calculation, after a calculation has just been cleared, or when the calculator has just appeared on the screen, all calculator button icons are enabled except "CLEAR" button icon 355, "=" button icon 450, and scrolling button icon 460. In addition, if none of the categories making up the report is for the Period dimension then "TREND" button icon 440 is not enabled.

When a function has been selected, but no components are selected, all the row and column data items are enabled as well as "CLEAR" button icon 455. If the "VARIANCE," "CHANGE," or "RATIO" button icons have been touched, "IN%" button icon 445 is enabled as well. Once "IN%" button icon 445 is touched, however, it then becomes unavailable.

When a function has been selected and a data item has been selected, then only the data items which are in the same dimension, as the first selected data item are enabled. "CLEAR" button icon 455 and "=" button icon 450 are also enabled at this time. If the "VARIANCE," "CHANGE," or "RATIO" button icons are touched, then the "CLEAR," "IN%", and "=" button icons are enabled after two data items are selected. In addition, when "VARIANCE" button icon 435 has been touched, "+/−" button icon 448 is enabled. If "IN%" button icon 445 is touched before a calculator button icon, then only the "VARIANCE," "CHANGE," "RATIO" and "CLEAR" button icons are enabled.

When the "TREND" function has been selected by touching "TREND" button icon 440, and if "=" button icon 450 is then touched, "NEXT" button icon 443 and a "DONE" button icon 449 are enabled and displayed. In a preferred embodiment, these icons replace "=" button icon 450 and "CLEAR" bottom button icon 455, respectively.

When the calculation being built is larger than display window 470, then scrolling button icons 460 are enabled. In addition, when there is any calculated item and a calculation is not in progress, then a "CALC TOOLS" button icon 142' (FIG. 3), which replaces a "TOOLS" bottom button icon 142 as explained below, is enabled.

Finally, when "AUDIT" button icon 465 has been touched, then all of the header items are enabled as is a "DONE WITH AUDIT" bottom button icon 147" (FIG. 3), which replaces "RETURN" bottom button icon 147. "=" button icon 450 is not enabled.

Unavailable or disabled button icons or items have no effect on completing a function. When an enabled or available item is touched in the preferred embodiment, one type of auditory feedback is produced. When a disabled or unavailable item is touched, a different type of auditory feedback is produced.

The color of the text is also used to indicate the mode of the different functions. For example, the calculator buttons icons normally contain white text. When they are selected, their text becomes yellow. The row and column header items normally have white text, but if they are row and column header items for calculated items, their text is gold. Similarly, the text of data items in rows or columns selected for a calculation are gold. If "AUDIT" button icon 465 is touched, then the row and column header items that are components of the selected calculation have green text.

In operation, after a button icon is touched to select a function, that icon and its text change color to indicate the selection and an equation for the function selected appears in window 470. Then one or more data items are selected to be components of the indicated equation function. Once a data item is selected by touching it, the data item changes colors as indicated above, and the text in the row or column header items of the selected function then appear in window 470 as part of the equation for the indicated function.

In the case of "VARIANCE," or "CHANGE," button icons, only two data items can be selected. For the "TREND," or "RATIO" button icons, at least two data items can be selected. For "AUDIT" button icon 465, only one calculated data item can be selected. For the remaining functions, there is no theoretical limit to the number of data items which can be selected as components, although there is obviously a practical limit. In a preferred embodiment, this practical limit is limited only by the size of the memory allocated for storing the components, as discussed below.

For the "VARIANCE" and "CHANGE" button icons, a complete equation is initially displayed in window 470, with place-holding symbols such as "A" or "B" indicating where in the equation the names of the selected data items belong. Both the "VARIANCE" and the "CHANGE" functions cause "A−B" to be displayed in window 470. As data items are selected, the names of the selected data items replace the place-holding symbols in window 470. If, for either the "VARIANCE" or "CHANGE" button icons, the user touches "IN%" button icon 445, the displayed equation becomes "100×(A−B)/A". If, for the "VARIANCE" button icon, the user touches "+/−" button icon 448, the equation is displayed as "(B−A)" or "100×(B−A)/A", depending if the "IN%" button icon has been touched.

For the "TREND" and "RATIO" button icons, two place-holding symbols are initially displayed and additional place-holding symbols are displayed once the user has selected two data items.

For the "TOTAL," "MULTIPLY," and "AVERAGE" button icons, an initial place-holding symbol, such as "A," is displayed in window 470. As each row or column of data items is selected, the name of the selected row or column replaces the place-holding symbol in the equation in window 270, and a function symbol, such as "+", is displayed followed by a new place-holding symbol. In a preferred embodiment, for example, when the "AVERAGE" function is selected, the words "AVERAGE OF A" are displayed in window 470. After a data item row or column is selected, "A" is replaced by the name of the selected row or column (for example, ROW1) and the following is displayed in window 470: "AVERAGE OF ROW1, B." The user continues in this fashion to select a theoretically unlimited number of data items to be averaged. In a preferred embodiment, data items may be selected repeatedly without causing system errors. Each time a data item is selected, it is entered into the equation being built in window 470. Both calculated items and data items may be selected to build an equation.

Once all the components of an equation have been selected, "=" button icon 450 is touched, which causes the calculations to be performed and causes a calculated item to be determined. If the data items selected as components are columns, then the calculated item is displayed as another column which, in general, is placed to the right to the rightmost ones of the column data items selected as components. If the data items selected as components are rows, then the calculated item is displayed as a row immediately below the lowermost one of the row data items selected as components. As indicated, the calculated data items have different color text from the other data items so they can be easily distinguished.

The calculated items appear to the user as a part of the multi-dimensional data model, and may be manipulated as if they were data items. The one difference is that the main data base from which the original model was created is not changed to contain the calculated items, and a calculated item will be displayed only when the dimension from which it was calculated is displayed as a row or column header. For example, the Variance column of FIG. 1 will be displayed only in views displaying data of the Versions dimension in rows or columns. The equation for the Variance column is stored in local data base 650 in association with the Versions dimension. Each time the Versions dimension forms a row or column, the data under the Variance header will be recalculated according to the other displayed dimension and the categories selected in view definition block 110 and displayed along with the data for the Version dimension.

Calculator icon 400 appears when the calculator function has been selected from the menu that appears after the "TOOLS" bottom button icon 142 is selected. "TOOLS" bottom button icon 142 then becomes "CALC TOOLS" bottom button icon 142'. Touching "CALC TOOLS" bottom button icon 142' causes an auxiliary calculator icon 500, shown in FIG. 5, to appear.

Figure 5:
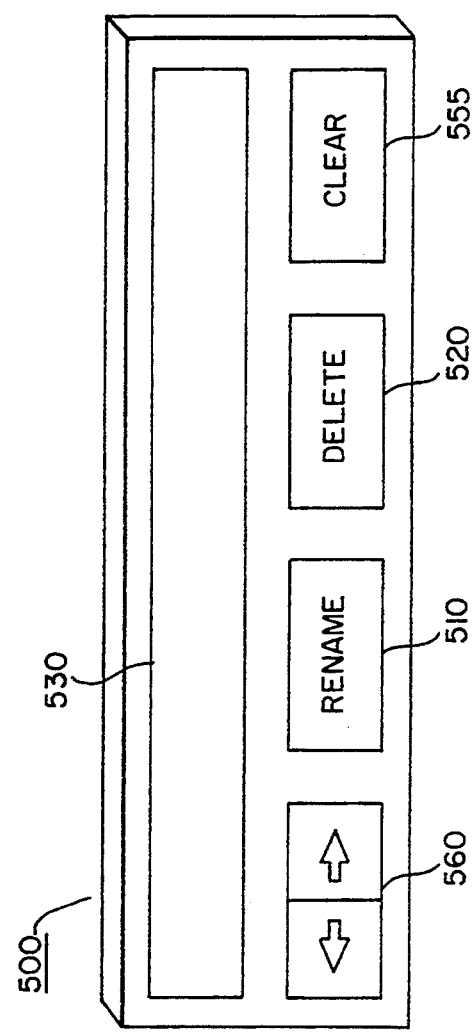
FIG. 5 is a schematic representation of a preferred auxiliary calculator icon which is used in accordance with the present invention.

As shown in FIG. 5, auxiliary calculator icon 500 includes a "RENAME" button icon 510 and a "DELETE" button icon 520 as well as an auxiliary window 530. Auxiliary calculator icon 500 also includes a scrolling button icon 560, which contains arrows, and a "CLEAR" button icon 555, which, respectively, function in a manner similar to scrolling button icon 460 and "CLEAR" button icon 455 of calculator icon 400.

Touching "RENAME" button icon 510 allows a user to substitute new text for selected calculated row and column headers. For example, all data calculated by the "VARIANCE" function initially has a row or column header reading "VARIANCE," as shown in FIG. 1. "RENAME" button icon 510 allows the header for selected calculated data to be changed. Touching "DELETE" button icon 520 causes the selected rows or columns of data items to be deleted from the display. Auxiliary window 530 contains the header item which is to be renamed, or the column or row header item of the data item which is to be deleted. The header items are entered into auxiliary window 530 using a keyboard. The "ENTER" (or "RETURN") key on the keyboard indicates that the header item has been typed in. "CLEAR" button icon 455 clears auxiliary window 530.

Auxiliary calculator icon 500 has certain display rules similar to the display rules of calculator icon 400. When a data item is about to be deleted, "DELETE" button icon 420 is touched, which cause the text in the header of the selected row or column to turn from white to yellow. In addition, if no function is currently in progress in the auxiliary calculator icon, either because a function has just finished, has been cleared, or because the auxiliary calculator icon has just appeared, then the "RENAME" and "DELETE" button icons are enabled as is a "DONE WITH TOOLS" bottom button icon 147''' (FIG. 3), which replaces "RETURN" bottom button icon 147. Furthermore, all calculated row and column header items are also enabled.

When a function has been selected by touching the appropriate button icon but no component has been selected, then all calculated row and column header items are enabled as is "CLEAR" button icon 555. When a row or column item has been picked, but no function has been touched, then the "RENAME" and "DELETE" button icons are enabled.

When "RENAME" button icon 510 has been touched, and a calculated item has been touched, then "CLEAR" button icon 555 and the keyboard are enabled. When "DELETE" button icon 520 has been touched and a calculated item has been touched, then a delete confirmation panel is enabled and displayed. The delete confirmation panel displays the name of the row or the name of the column to be deleted and requests confirmation from the user before performing the deletion. When the calculated item that has been touched has an equation that is larger than the display window, then the scrolling button icons 560 are enabled.

Figure 6:
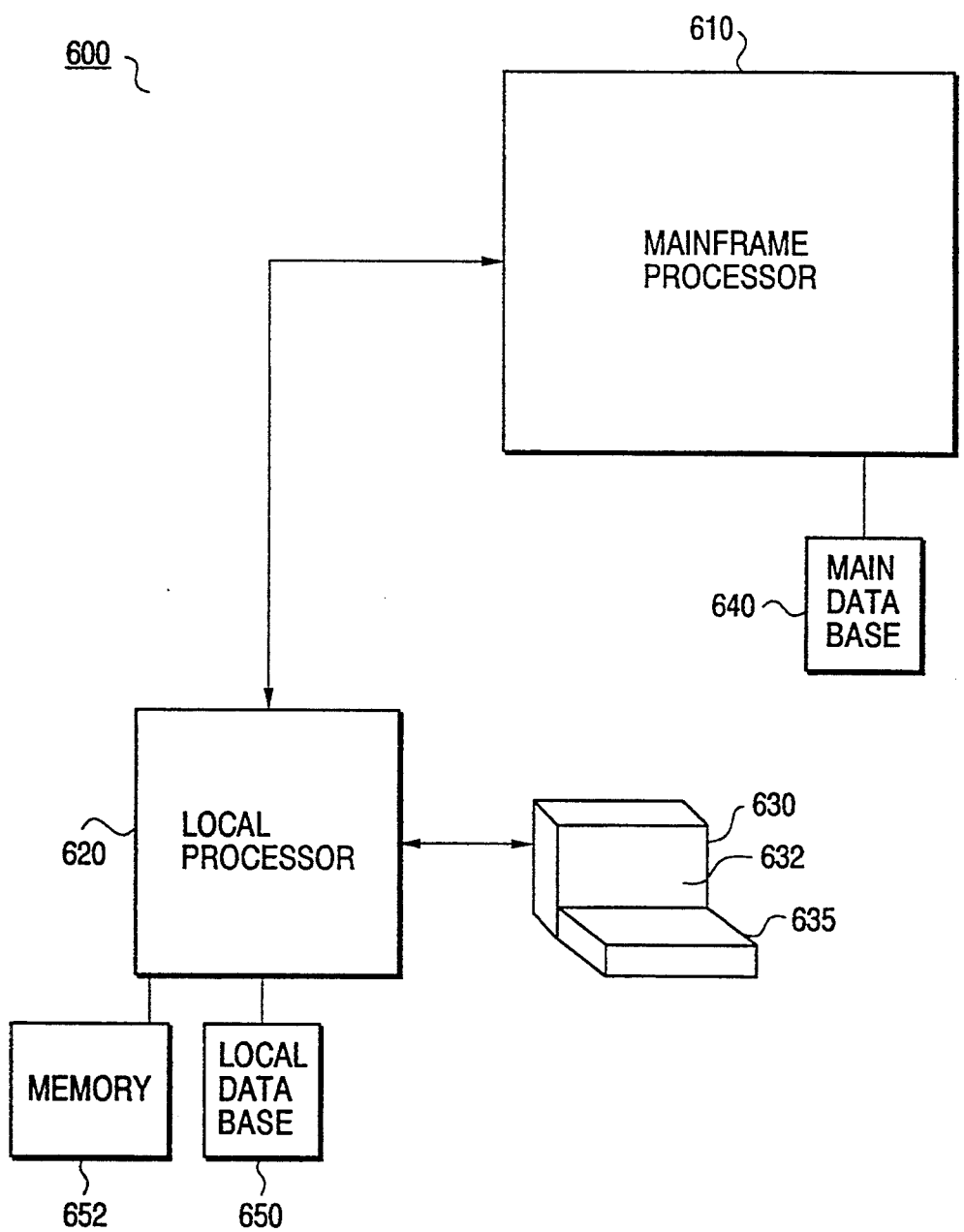
FIG. 6 is a schematic representation of a computer system capable of implementing the present invention.

Preferably, the calculator function described above is used on a distributed computer system 600, such as is shown in FIG. 6. System 600 includes a mainframe processor 610, a local processor 620, such as a conventional microprocessor, a display terminal 630, a main data base 640, a local data base 650, and a memory 652. Display terminal 630 preferably includes a touch sensitive terminal screen. Display terminal 630, which preferably includes touch sensitive screen 632 (or a mouse), and keyboard 635 are driven by the local processor 620, which also includes certain functions such as calculation of functions indicated on calculator icon 400 and updating of local data base 650 according to main data base 640.

Main data base 640 is preferably a multi-dimensional data base, although the invention may also be used in conjunction with conventional two-dimensional types of data bases. The data in main data base 640 is created by a process not described here, but known to persons skilled in the art. Local data base 650 is also preferably a multi-dimensional data base, although the invention may also be used in conjunction with other types of data bases. Local data base 650 is created by transferring data from main data base 640 by a process not described here, but known to persons skilled in the art.

Mainframe processor 610 updates main data base 640 and communicates values in main data base 640 to local data base 650 under control of local processor 620. The "GET CURRENT DATA" function causes local data base 650 to be updated from main data base 640. Memory 652 preferably stores software instructions executed by local processor 620 to implement the method of the present invention and various data structures also used to implement the present invention.

Other embodiments of the present invention may contain only a single processor and a single data base. Still other preferred embodiments of the present invention may include only one memory combining the functions of memory 652 and local data base 650.

Figure 7:
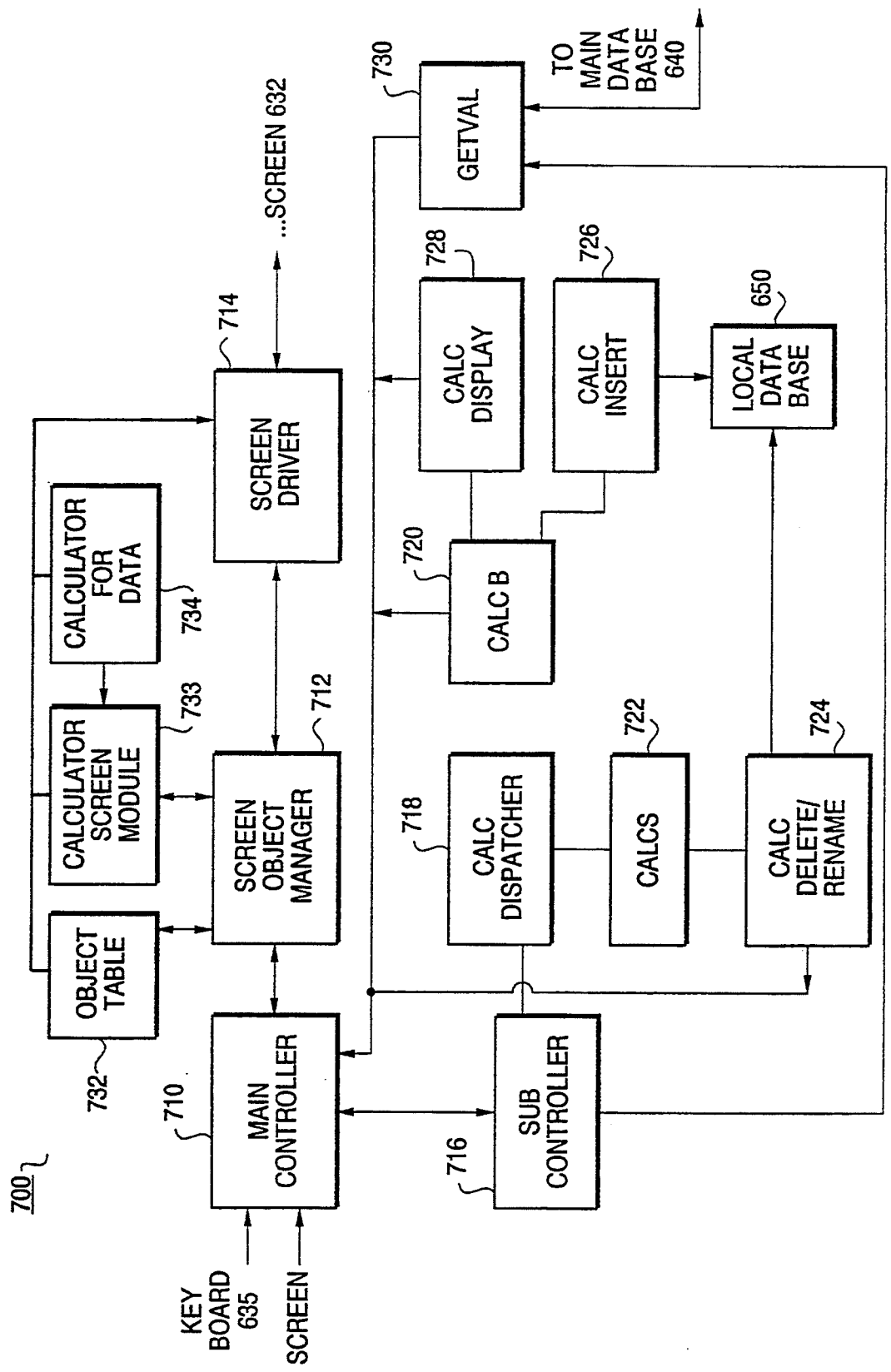
FIG. 7 is a schematic representation of software modules and data structures of the computer system of FIG. 6, which can be used in the preferred embodiment of the present invention.

Whatever the hardware implementation, the software is the key to realizing the present invention. FIG. 7 shows a data flow 700 between software modules and data structures of the present invention. Preferably, these software modules and data structures are stored in memory 652 corresponding to local processor 620 and are executed by local processor 620. It will be apparent to a person of ordinary skill in the art that many variations of the described data flow can be used to practice the present invention. Similarly, many variations of the number, names, and complexity of the software modules can be used to practice the present invention.

FIG. 7 shows software modules for a main controller 710, a subcontroller 716, a screen object manager 712, a screen driver 714, a calculator dispatcher 718, a calcB module 720, a calcS module 722, a calc delete/rename module 724, a calc insert module 726, a calc display module 728, a getval module 730, and a calculator screen module 733. FIG. 7 also shows data structures stored in a memory corresponding to local processor 620, and including a screen object data structure 732, calculator data 734, and local data base 650.

Main controller 710 inputs and outputs data defining screen objects to and from screen object manager 712. Three important types of screen objects are: row/column header objects, calculator objects, and report objects. The headers located above each column and to the left of each row of the display are called row header objects and column header objects, respectively. These row/column header objects must be passed to and from main controller 710 when the screen is displayed and when a row or column is renamed with auxiliary icon 500 as described above. Calculator objects are the various button icons, display panels, and backgrounds that are combined to make up the calculator icon. Report objects are the data that are displayed in the various rows and columns of a displayed report. Other types of screen objects include, for example, button objects and menu objects.

When keyboard 635 or touch sensitive screen 632 of terminal 630 receive an operator input, they convert it to an input signal, which is sent to main controller 710. Main controller 710 then passes control to subcontroller 716. Screen object manager 712 manages screen object data structure 732, which contains descriptions of the row and column headers and the data currently displayed on the screen, and calculator data 734, which contains descriptions of the new rows and columns added by use of calculator icon 400, as described above.

Main controller 710 communicates with subcontroller 716 to direct the appropriate processing operation when a button icon is touched. For example, subcontroller 716 calls module getval 730 whenever data is be fetched from local data base 650. For example, when the "GET CURRENT DATA" bottom button icon 145 has been touched, module getval 730 communicates with main processor 610 to update local data base 650 with current values from main data base 640. The updated current data base values are then passed to main controller 710 where they are displayed under the control of screen object manager 712 and screen driver 714. Module getval 730 also handles access to local data base 650 for the other software modules and performs the actual calculations involved in displaying calculated data on the screen, as discussed in more detail below.

When calculator icon 400 of FIG. 4 or auxiliary calculator icon 500 of FIG. 5 is displayed, subcontroller 716 also communicates with calc dispatcher module 718. Calc dispatch module 718 receives, from main controller 710, each screen touch or keyboard entry made when calculator icon 400 or calculator icon 500 is displayed. Calc dispatch module 718 processes mode changes (for example, the change in and out of the calculator mode itself), calls calcB module 720 for all functions selected from calculator icon 400, and calls calcS module 722 for all functions selected from auxiliary calculator icon 500. The "B" in "calcB" stands for "Big." CalcB module 720 processes calculator icon 400, which is the larger of the two calculator icons. The "S" in "calcS" stands for "Small." CalcS module 722 processes calculator icon 500, which is the smaller of the two calculator icons. The main function of calcB module 720 is to build the calculations indicated on calculator icon 400. This process is described below in detail.

CalcB module 720 calls getval module 730 to calculate the values to be inserted in the screen display as the result of a newly calculated row or column. Calc insert module 726 inserts the newly calculated values into local data base 650. These values are not inserted into main data base 640, however. After the newly calculated values are inserted into local data base 650, calcB module 720 calls calc insert module 726 to calculate the screen position of the newly calculated data and any other changes in screen position caused by insertion of the newly calculated data. Calc display module 728 controls the display of text seen in window 470 and auxiliary window 530.

CalcS module 722 calls a delete function of calc delete/rename module 724 when a row or column of calculated data is deleted by use of the auxiliary calculator icon 500 as discussed above. CalcS module 722 calls a rename function of calc delete/rename module 724 when a row or column of calculated data is renamed by use of the auxiliary calculator icon 500 as discussed above.

Figure 8:
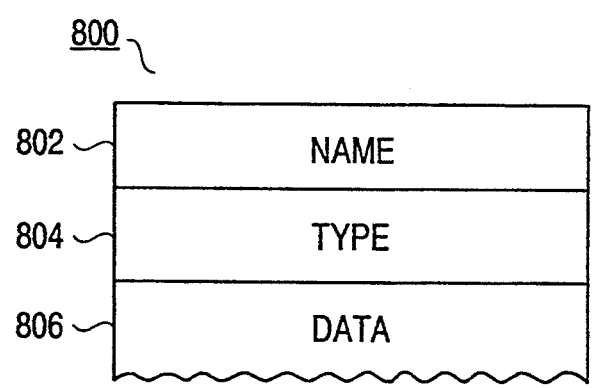
FIG. 8 is a diagram of one data object in the local data base of FIG. 6.

FIG. 8 is a diagram of one data object 800 in the local data base 650 of FIG. 6. The data object is simplified for ease of description, in that the portions giving the data base its three-dimensional nature are not shown. Data object 800 includes a name field 802, a type field 804, and data 806. Name field 802 contains the row header or column header displayed above the data object 800 when data object 800 is displayed as part of a two-dimensional display. Type field 804 indicates whether the data 806 in data object 800 is mainframe data or calculated data. Mainframe data is data that has been loaded into local data base 650 from main data base 640. Mainframe data cannot be changed in local data base 650. Calculated data is data for which an equation has been defined using calculator icon 400 and which has then been calculated according to the equation. As explained above, the equation may refer to both mainframe data and previously calculated data.

It should be noted that calculated data is only calculated for the two-dimensional view being displayed when the equation for the calculated data is defined. If the user changes the report being displayed, the headers for the calculated data are still displayed, but the rows and columns of calculated data are recalculated. If the user changes the view, the calculated items may not appear if the dimension with which they are associated is no longer displayed.

Figure 9:
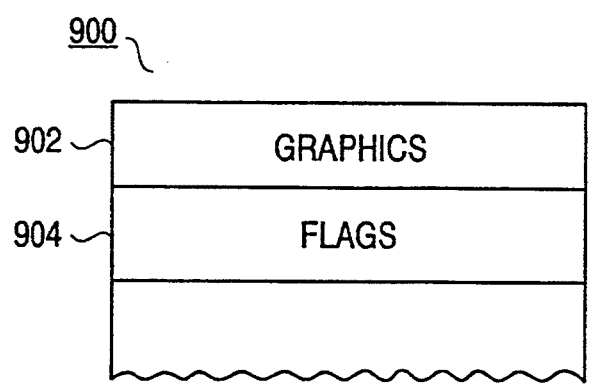
FIG. 9 is a diagram of a screen object data structure stored in a memory of FIG. 6, according to the present invention.

FIG. 9 is a simplified diagram of one entry 900 of screen object data structure 732, which is stored in memory 652 of FIG. 6. Screen object data structure entry 900 includes a graphics portion 902, which defines the shape of a screen object when it is displayed on the screen, and flags 904. Flags 904 further define the object represented by screen object data structure entry 900. Flags 904 indicate, for example, whether the object is enabled or not enabled, selected or not selected, and mainframe or calculated data.

CalcB module 720 must know when a row object is selected if the selected row object is to be incorporated into one of the functions of calculator icon 400. Similarly, calcS module 722 must know when a column object is selected if the selected column object is to be renamed or deleted.

Main controller module 710 changes the colors of the display when objects are selected, deselected, enabled, or disabled, and when the calculator display portion is cleared. As explained above, if the user touches an object on the touch sensitive screen, and that object is not enabled, no color change will take place and an "error" tone will sound. In contrast, if the touched object is enabled, a "selected" tone will sound and the object will change color to indicate that it has been selected. Main controller module 710 controls these responses. In addition to indicating a change in screen color, calc screen module 733 also ensures that the correct flags are set in screen object data structure entry 900, if the state of an object is changed from selected to deselected or from enabled to disabled.

FIG. 10 is a diagram of an entry 1000 in a first portion of calculator data structure 734 stored in memory 652 of FIG. 6. Calculator data structure entry 1000 includes an identifier 1002, a button count 1004, button sizes and positions 1006, a display area background color 1008, and display area text 1010. Calculator data structure entry 1000 is used by calculator screen module 733 to control the display of a calculator icon. Each calculator icon 400 and 500 has its own entry in calculator data structure 734. The entries are used to draw the calculator icons on the screen.

For example, if in the entry for calculator icon 500, identifier 1012 indicated that the entry was for calculator icon 500, button count 1004 would contain the value "4," because calculator icon 500 contains four button icons. (Scroll button icon 560 is counted as a single button icon.) Button sizes and positions 1006 would contain the sizes and positions each of the four buttons on calculator icon 500. Display area background color 1008 would contain a value indicating "black." Display area text 1010 would indicate, for example, the text displayed in the display area of calculator icon 500.

FIG. 11 is a diagram of an entry 1100 in a second portion of calculator data structure 734 stored in memory 652 of FIG. 6. Calculator data structure entry 1100 includes an enabled flag 1102, a foreground color 1104, a text color 1106, a special flag 1108, and button text 1110. Each button icon in calculator icon 400 and calculator icon 500 has a corresponding calculator data structure entry 1100. For each entry 1100, enabled flag 1102 indicates whether the corresponding button object is enabled. Foreground color 1104 indicates the current foreground color of the button icon. Text color 1106 indicates the current text color of the button icon. When a button icon is enabled or disabled, foreground color 1104 and text color 1106 will change. Special flag 1108 indicates foreground and text colors for such special cases as "+/−" button icon 448, which is displayed with "IN%" button icon 445. In such a case, the entry for "IN%" would hold the colors for "+/−" in special flag 1108. Button text 1110 contains the text currently displayed within the button icon.

FIGS. 12 and 13 are diagrams of a first calculation building data structure 1200 and a second calculation building data structure 1300. Structure 1300 is a continuation structure of structure 1200. One or more structures 1300 are used as a calculation is built, depending on the number of components of the calculation. The calculation building process is performed by calcB module 720, and builds structures 1200 and 1300 to hold components of a calculation temporarily as they are entered. These temporary structures 1200 and 1300 are initialized by a user touching a button icon of calculator icon 400 that indicates a calculator function (such as "TOTAL" or "MULTIPLY", for example), and augmented by touches on row or column header item names. When "CLEAR" button icon 455 is touched, structures 1200 and 1300 are cleared. When "=" button icon 450 is touched, the structures 1200 and 1300 are saved to local data base 650 with a type indicating calculated data. Structures 1200 and 1300 are then cleared for the next calculation.

Structures 1200 and 1300 are also used by calcS module 722 when one of the functions of auxiliary calculator icon 500 is touched followed by one of the calculated item names being touched, i.e., when a calculated item is to be deleted or renamed in a preferred embodiment. Once the function, e.g., delete or rename, has been completed by calcS module, the changed structure is entered in local data base 650 and structures 1200 and 1300 are cleared. If the process is interrupted, e.g., via "CLEAR" button icon 455, via the user indicating "NO" to the deletion descriptor, or via the user stopping a rename function by touching the escape key on keyboard 635, structures 1200 and 1300 are cleared.

FIG. 12 shows a first type of calculation building record 1200. If the calculation contains more than five operands (component items), some of the component items are stored in one or more records 1300 of FIG. 13.

Structure 1200 includes a record type 1202, a continuation record number 1204, up to five operand record numbers 1206, a function indicator 1208, a delete pending flag 1210, a dimension number 1212, an item name 1216, preceding and subsequent trend record numbers 1218, a parent item number 1220, and an item list position under parent 1222.

Record type 1202 can indicate a free (unused) record, a calculation record, or a continuation record. Continuation record number 1204 contains either a pointer to a record 1300 if a continuation record is needed, or a null pointer if no continuation record is needed. Operand record numbers 1206 indicate entries in local data base 650 defining the selected components of the calculation. Function indicator 1208 indicates the calculator button icon touched, e.g., "TOTAL."

Delete pending flag 1210 is used when "DELETE" button icon 520 of calculator icon 500 has been touched, but before the delete confirmation message has been displayed. During this time, calc delete/rename module 724 locates any other calculations dependent on the item about to be deleted (This is done by checking through all entries 1200 and 1300), sets the delete pending flags of any located calculations to TRUE, and redisplays the located calculations on the display in a warning color. Thus, the user is able to see the effects of deleting a certain calculated row or column. If the user decides to delete the calculated row or column, all items having a delete pending flag set to TRUE are also deleted.

Dimension number 1212 indicates the dimension with which the calculation is associated, i.e., the dimension whose data is used to perform the calculation. As discussed above, calculated data will only be displayed with the dimension with which it is associated. Thus, it is necessary to keep a record of the associated dimension for each calculation that is built. Each dimension has an associated calculation list containing all calculations built associated with that dimension. When a new calculation is built, it is added to the appropriate list. Item name 1216 indicates the row or column header name of the built calculation. Item name 1216 can be changed by using the "RENAME" function of calculator icon 500, as processed by calc delete/rename module 724.

Preceding and subsequent trend numbers 1218 are used with the "TREND" function, and keep track of the preceding and subsequent historical periods, created when the user touches the "NEXT" button icon. Keeping track of preceding and subsequent trend numbers optimizes future calculations of trend data.

Parent item number 1220 is only used in embodiments of the present invention in which main data base 640 and local data base 650 have "hierarchical" data structures. For example, the data for a category "all states" is a "parent" of lower level data categories "Maine," "Vermont," "Delaware," and "Massachusetts." Parent item number 1220 references a location in local data base 650 of parent data of the highest level component data in the equation. Parent item number 1220 may be omitted in embodiments of the invention not using a hierarchical data structure.

Structure 1300 includes record type 1302, which contains the same possible values as record type 1202, next continuation record number 1304, which holds the same type of data as continuation record number 1204, and up to ten operand record numbers 1306, which hold the same type of data as five record operand numbers 1206. In the described preferred embodiment, the first three records of the structures 1200 and 1300 are in the same relative position, to promote efficiency and ease of use.

At the same time that the structures 1200 and 1300 are being built, the screen touches are being incorporated into a string to be displayed in the display window of the calculator icon by calc display module 728. If the string is longer than the display window, only an appropriate portion of the string is displayed.

When a new calculation is built, i.e., after "=" button icon 450 or "NEXT" button icon 443 for the "TREND" function has been touched, the items in structures 1200 and 1300 are evaluated by calc insert module 726. The evaluation includes assigning a record number to the calculation, filling in the subsequent and preceding trend fields, if necessary, filling in the parent item number and item list position, and copying the temporary structures 1200 and 1300 to a permanent list for the dimension with which the equation is associated.

Getval module 730 performs the actual calculations to obtain the calculated results for a newly built equation. In a preferred embodiment, getval module 730 is a recursive routine. Its function is to get all data items. It calculates calculated items or retrieves mainframe data items from main data base 640, when necessary. For calculated items, getval module 730 first fetches the values of all operands whose name are contained in fields 1206 and 1306. Once all operands have been retrieved, getval module 730 performs the calculation indicated in field 1208. Occasionally, a calculation may be interrupted in progress. For this reason, in a preferred embodiment, intermediate results of the calculation process are stored in local variables of getval module 730 instead of in static variables in the low-level calculation routines called by getval module 730.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A method for facilitating analysis of data in a data file stored in a computer system comprising the following steps executed by the computer system:
displaying on a computer screen a view of the data file, the view having data arranged in rows and columns;
displaying a calculator icon on the computer screen, the calculator icon including a plurality of button representations each corresponding to a different function that can be applied to rows and columns in the data file and a display area for displaying ones of the functions;
receiving from an input device information identifying a one of the functions selected by the user;
receiving from the input device information identifying a row or a column of the data file to which the selected function is to be applied;
displaying in the display area of the calculator icon an equation defining an application of the selected function to the identified row or column;
applying the selected function to all data in the identified row or column data to produce a set of calculated results;
entering the set of calculated results into the data file; and
displaying the set of calculated results on the computer screen as part of the displayed data file proximate to the identified row or column.

2. The method of claim 1, wherein certain displayed data file portions are appropriate for the selected function, further comprising the step of:
altering the view of the data file after receiving the information identifying the selected function and before receiving the information identifying the identified row or column to indicate the portions of the displayed data file which are appropriate for the selected function.

3. The method of claim 1, wherein certain ones of the displayed functions are appropriate to apply along with the selected function, further including the step of:
altering the button representations of the functions after receiving the information identifying the selected function and before receiving the information identifying the identified row or column to indicate additional ones of said functions which are appropriate to apply along with the selected function.

4. The method of claim 1 wherein the data file has at least two dimensions, and wherein the method includes the steps of
receiving from the input device an indication of a different view of the data file to be added to the data file representation; and
displaying the different view of the data file, including the set of calculated results, on the computer screen.

5. The method of claim 1 further including the step of displaying, in a portion of the calculator icon, an indication of the selected function applied to the identified row or column.

6. The method of claim 1, wherein the substep of displaying the equation includes the substeps of
displaying the equation, before receiving the information identifying the identified row or column, to include a place-holder symbol and a symbol indicating the selected function; and
altering the displayed equation, after the information identifying the identified row or column is received, so that the place-holder symbol is replaced by a symbol indicating the identified row or column.

7. A method for facilitating analysis of data in a multidimensional data model stored in a computer system comprising the following steps executed by the computer system:
displaying a view of the data model on a computer screen, the view having data arranged in rows and columns;
displaying a calculator icon on the computer screen, the calculator icon including a plurality of button representations each corresponding to a different function that can be applied to the displayed data model and a display area for displaying ones of the functions;
receiving from an input device coupled to the computer screen an indication that one of the button representations has been selected, thereby selecting a function corresponding to the selected button representation;
altering the view of the data model to indicate the rows and columns of the view that are appropriate for the selected function;
receiving from the input device indications of a row or a column of the indicated data model portions to which the selected function is to be applied;
displaying in the display area of the calculator icon an equation defining an application of the selected function to the identified row or column;

applying the selected function to all data in the indicated row or column to produce a set of calculated results; and displaying the set of calculated results on the computer screen as part of the view of the data model proximate to the indicated row or column.

8. The method of claim 7 further including the step of:

receiving from the input device an indication for a different view of the data model; and displaying the different view of the data model, including the set of calculated results, on the computer screen.

9. The method of claim 7 wherein the computer system includes a main processor coupled to the data model and a local processor coupled to said computer screen and containing a data file including the data displayed in the view, the method including the step of transferring indicated row or column from said main processor to said local processor.

10. The method of claim 7, wherein the view includes a plurality of rows and columns each including a header portion and values, the rows and columns being collectively termed display elements, and wherein the step of receiving indications of the row or column includes the substep of:

receiving indications of display elements selected by a user such that all of the selected display elements are either only rows or only columns.

11. The method of claim 10 wherein the step of displaying the set of calculated results includes the substep of displaying the set of calculated results on a new row or a column in the view, wherein said new row or column includes a header.

12. The method of claim 7, wherein one of the plurality of button representations included in the calculator icon is a button representation indicating the step of changing the calculator icon, further including the steps of:

receiving from the input device data indicating that the button representation indicating an action of changing the calculator icon has been selected, thereby selecting a function of changing the calculator icon;

displaying an auxiliary calculator icon in response to the indication to change the calculator icon, the auxiliary calculator icon containing auxiliary button representations each corresponding to a different auxiliary function;

receiving from the input device an indication that one of the auxiliary button representations has been selected, thereby selecting the auxiliary function corresponding to that auxiliary button representation; and performing the selected auxiliary function corresponding to the selected auxiliary button representation.

13. The method of claim 12 wherein the view includes a plurality of rows and columns, each including a header portion and values, the rows and columns being collectively termed display elements, wherein the step of receiving indications of indicated row or column includes the substep of:

receiving indications of display elements selected by a user as either only rows or only columns;

wherein the step of displaying the set of calculated results include the substep of:

displaying the set of calculated results as a view display element; and wherein the step of performing the selected auxiliary function includes the substeps of:

modifying the header portion of the displayed view display element, and modifying the display element to reflect the auxiliary function.

14. The method of claim 12 wherein one of the plurality of button representations in the calculator icon is an audit button representation corresponding to an audit function, and wherein the step of applying the selected function includes the substeps of:

applying the audit function to one of the display elements containing calculated values; and displaying, for the one of the display elements containing calculated values, the equation, including functions and names of data file subportions, used in obtaining the set of calculated results.

15. A data processing system for facilitating analysis of data in a multi-dimensional data model comprising:

first means for displaying on a computer screen a view of the data in the data model, the view having data arranged in rows and columns;

second means for displaying a calculator icon with the view on the first displaying means, the calculator icon including a plurality of button representations each corresponding to a different function to be applied to the data in the data model and a display area for displaying ones of the functions;

means, coupled to the second displaying means, for selecting one of said button representations;

means, coupled to said first and second displaying means, for controlling the display means to display a different view of the data model on the display means to indicate rows and columns of the view which are appropriate for the selected function;

means for receiving data identifying a row or a column of the indicated rows and columns to which the selected function is to be applied;

means for displaying in the display area of the calculator icon an equation defining an application of the selected function to the identified row or column;

means for applying the selected function to all data in the identified row or column to produce a set of calculated results; and means for displaying the set of calculated results on the computer screen as part of the data model proximate to the identified row or column.

16. An apparatus for facilitating analysis of data in a data file stored in a computer system, comprising:

a computer screen;

first means for displaying on the computer screen a view of the data in the data file, the view having data arranged in rows and columns;

second means for displaying a calculator icon on the computer screen the calculator icon including a plurality of button representations each corresponding to a different function that can be applied to portions of the data in the data file and a display area for displaying ones of the functions;

an input device for reading data input by a user;

means for receiving information from the input device identifying a first one of the displayed functions;

means for receiving from the input device information identifying a row or a column of the stored data file to which the first displayed function is to be applied;

means for displaying in the display area of the calculator icon an equation defining an application of the selected function to the identified row or column;

means for applying the first selected function to all data in the identified row or column to produce a set of calculated results;

means for entering the set of calculated results into the data file; and means for displaying the set of calculated results on the computer screen as part of the view of the data file proximate to the identified row or column.

17. The apparatus of claim 16, further including:

means for altering the display data of the data file, after receiving the information identifying the first selected function and before receiving the information identifying the identified row or column, to indicate the portions of the data file which are appropriate for the selected function.

18. The apparatus of claim 16 further including:

means for altering the button representations of the plurality of functions, after receiving the information identifying the first selected function and before receiving the information identifying the identified row or column, to indicate additional ones of said functions which are appropriate for application with the selected function.

19. The apparatus of claim 18 further including:

means for receiving from the input device information identifying a second selected one of the functions from the ones of the function which are identified as appropriate for application along with the selected function;

means for receiving from the input device information identifying a second row or column of the stored data file to which the second selected function is to be applied; and means for applying the second selected function to the second identified row or column to alter a storage structure of the data file.

20. The apparatus of claim 16, wherein the data file has at least three dimensions, and wherein the apparatus includes:

means for receiving from the input device an indication of a different view of the data file to be added to the data file; and means, coupled to the receiving means, for displaying the different view of the data file, including the set of calculated results, on the computer screen.

21. The apparatus of claim 18 further including means for displaying, in a portion of the calculator icon, an indication of the selected function to be applied to the identified row or column.

22. An apparatus for facilitating analysis of multi-dimensional data in a multi-dimensional data model stored in a computer system, comprising:

a computer screen;

means for displaying a view of the multi-dimensional data in the data model on the computer screen, the view having data arranged in rows and columns;

means for displaying a calculator icon on the computer screen, the calculator icon including a plurality of button representations each corresponding to a different function that can be applied to the data in the data model and a display area for displaying ones of the functions;

an input device coupled to the computer screen;

means for receiving from the input device an indication that one of the button representations has been selected, thereby selecting the function corresponding to the selected button representation;

means for altering the view of the data model to indicate rows or columns of the view that are appropriate for the selected function;

means for receiving from the input device indications of a row or column of the indicated data model portions to which the selected function is to be applied;

means for displaying in the display area of the calculator icon an equation defining an application of the selected function to the identified row or column;

means for applying the selected function to all the data in the indicated row or column to produce a set of calculated results; and means for displaying the set of calculated results on the computer screen as part of the view of the data model proximate the indicated row or column.

23. The apparatus of claim 22, further including:

means for receiving from the input device an indication of a different view of the data model; and means for displaying the different view of the data model, including the set of calculated results, on the computer screen.

24. The apparatus of claim 22, further including:

a main processor containing the data model;

a local processor coupled to said computer screen and containing a data file including the data displayed in the view; and means for transferring data from said main processor to said local processor.

25. The apparatus of claim 24, wherein the means for displaying the set of calculated results includes means for displaying the set of calculated results on a new row or a column in the view, wherein said row or column includes a header.

26. The method of claim 22, wherein one of the plurality of button representations included in the calculator icon is a button representation indicating an action of changing the calculator icon, the apparatus further including:

means for receiving from the input device an indication that the button representation indicating the action of changing the calculator icon has been selected, thereby selecting the function of changing the calculator icon;

means for displaying an auxiliary calculator icon in response to the indication to change the calculator icon, the auxiliary calculator icon containing auxiliary button representations each corresponding to a different auxiliary function;

means for receiving from the input device an indication that one of the auxiliary button representations has been selected, thereby selecting the auxiliary function corresponding to that auxiliary button representation; and means for performing the selected auxiliary function corresponding to the selected auxiliary button representation.

27. The apparatus of claim 26, wherein the view includes a plurality of rows and columns, each including a header portion and values, the rows and columns being collectively termed display elements, wherein the means for receiving indications of indicated row or column includes means for receiving indications of display elements selected by a user as either only rows or only columns, wherein the means for displaying the set of calculated results includes means for displaying the set of calculated results as a view display element, and wherein the means for performing the selected auxiliary function includes means for modifying the header portion of the displayed view display element and means for modifying the display element to reflect the auxiliary function.

28. The apparatus of claim 26 wherein one of the plurality of button representations in the calculator icon is an audit button representation corresponding to an audit function, and wherein the means for applying the selected function includes:

means for applying the audit function to one of the display elements containing calculated values; and means for displaying, for the one of the display elements containing calculated values, the equation, including functions and names of data file subportions, used in obtaining the set of calculated results.

* * * * *